(12) United States Patent
Green et al.

(10) Patent No.: US 7,103,785 B2
(45) Date of Patent: Sep. 5, 2006

(54) METHOD AND APPARATUS FOR POWER MANAGEMENT EVENT WAKE UP

(75) Inventors: Alan M. Green, Houston, TX (US); Sung-Hsia Kuo, Houston, TX (US); Shawn C. Bish, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 10/448,708

(22) Filed: May 30, 2003

(65) Prior Publication Data

US 2004/0243860 A1 Dec. 2, 2004

(51) Int. Cl.
*G06F 1/26* (2006.01)
(52) U.S. Cl. .......................... 713/310; 713/2; 713/300
(58) Field of Classification Search ................ 713/300, 713/310, 323, 162, 2; 709/227
See application file for complete search history.

(56) References Cited

U.S. PATENT DOCUMENTS

| | | | | |
|---|---|---|---|---|
| 5,802,305 | A * | 9/1998 | McKaughan et al. | 709/227 |
| 5,925,131 | A * | 7/1999 | Novoa et al. | 713/300 |
| 5,938,771 | A * | 8/1999 | Williams et al. | 713/310 |
| 6,453,423 | B1 * | 9/2002 | Loison | 713/310 |
| 6,493,824 | B1 * | 12/2002 | Novoa et al. | 713/162 |
| 6,591,368 | B1 * | 7/2003 | Ryu | 713/323 |
| 2004/0064743 | A1 * | 4/2004 | Bolian et al. | 713/300 |

* cited by examiner

*Primary Examiner*—Hari Patel

(57) ABSTRACT

A method and apparatus may be provided to allow for the enablement or disablement of a computer remotely for servicing or other reasons. The computer may be enabled remotely by one or more circuits that may simulate a system switch turn on or turn off event.

18 Claims, 3 Drawing Sheets

METHOD AND APPARATUS FOR POWER MANAGEMENT EVENT WAKE UP

BACKGROUND

The present disclosure relates to computer systems and to methods and apparatuses for remotely bringing a computer/server out of a standby or sleep state. For serviceability and other reasons, it may be convenient to be able to wake up a computer from a location that may be remote from the physical location of the computer. For example, it may convenient to be able to turn on a computer, such as a server computer, from a remote servicing or diagnostics facility. Additionally, for security or energy conservation uses, it may be convenient to be able to cycle computers on or off remotely to enable or disable access to such computers as required by security or energy conservation needs.

Many computers today include a super I/O circuit. A Super I/O controller (peripheral controller) maybe considered a single chip that, much like the system chipset, contains peripheral support circuits that perform many of the functions that used to take several pieces of hardware in the past. The Super I/O chip typically is responsible for controlling the slower-speed, mundane peripherals found in every PC. Since these devices have been mostly standardized, they are virtually the same on every PC and it is easier to integrate these into a commodity chip instead of worrying about them for each motherboard design. However, newer super I/O devices may not allow for remote power cycling from all states of the machine.

This may be particularly inconvenient where a service event has been required and a technician may have forgotten to reset the power to the computer properly, thereby rendering the computer unusable. The technician may have departed the site and be many miles or states away. This may result in a very inconvenient and expensive situation for the servicing entity and for the computer user. The present disclosure may address one or more of the above issues.

BRIEF DESCRIPTION OF THE DRAWINGS

In accordance with embodiments of the present invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "included" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connect may be through a direct electrical connection, or through an indirect electrical connection via other devices and connections. The terms assertion, asserting and the like mean the associated signal or line is in an logical active state. Further, all examples included herein should be construed as being open-ended (i.e., not limiting in any way).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and a discussion of any embodiment is meant only to be exemplary of that embodiment, and not intended to intimate that the scope of the disclosure, including the claims, is limited to that embodiment.

Figure 1:
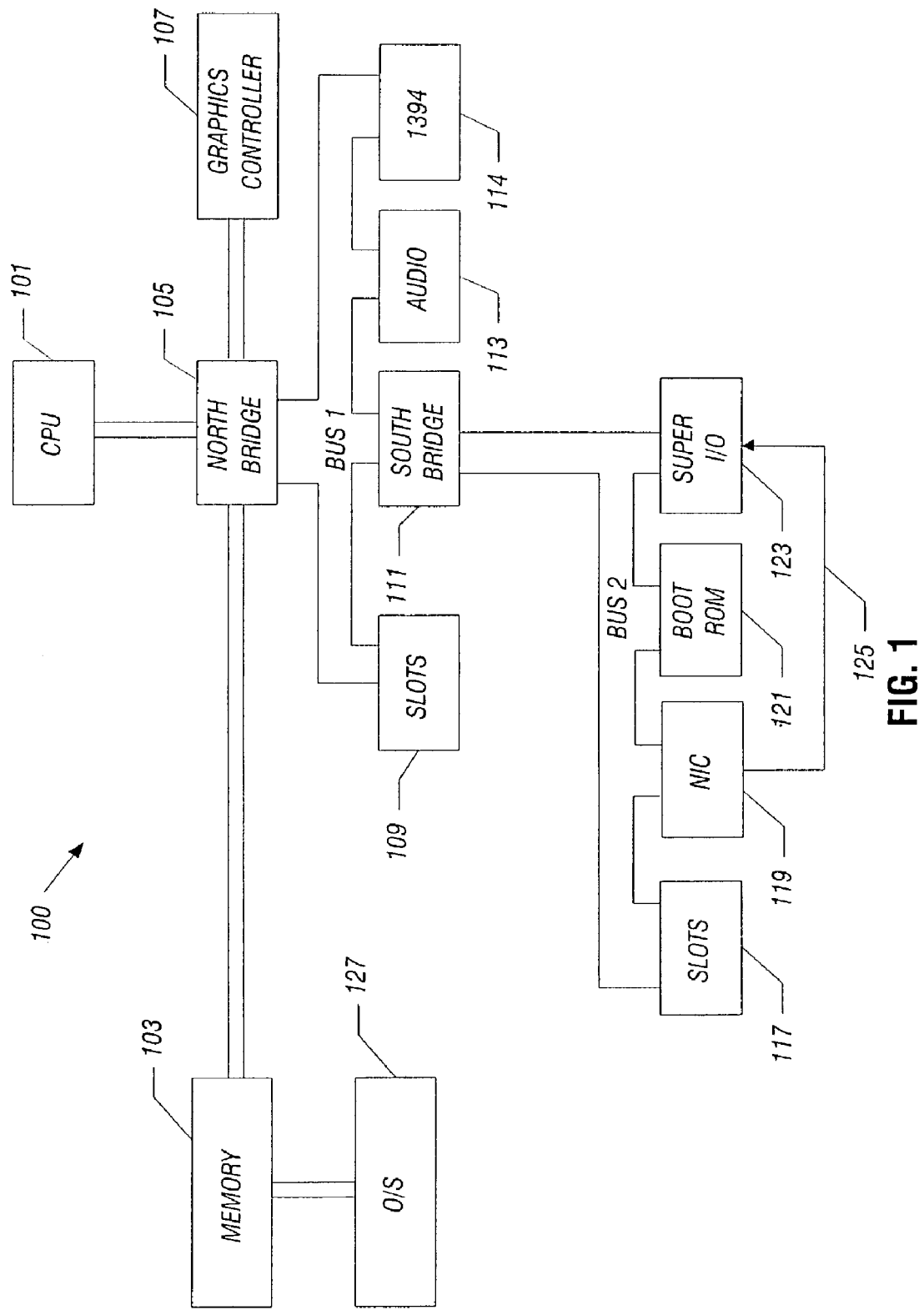
FIG. 1 illustrates a computer system in accordance with embodiments of the present invention.

Referring now to FIG. 1, a computer system 100 may include a central processing unit 101 or other processing device, one or more memory devices 103, and a bridge device such as a north bridge 105. The north bridge 105 may be coupled to a graphics controller 107 that may, in some embodiments, be connected to the north bridge 105 through a bus such as an advanced graphics port (AGP) bus.

Additionally, north bridge 105 may be coupled through bus 1 to plug-in slots 109 that may be utilized, in some embodiments, to expand the computer resources. Additionally, north bridge 105 may be coupled through bus 1 to a second bridge device such as a south bridge 111. North bridge 105 may also be coupled through bus 1 to various peripheral devices such as an audio section 113, an IEEE 1394 interface device 114, or other devices. South bridge 111 may be coupled through bus 2 to devices such as expansion slots 117, network interface controller 119, a boot ROM 121, a super I/O interface 123, or other such devices. Of course, other architectures and variations of this architecture may be utilized to achieve a similar function.

Bus 1 and bus 2 may be implemented in any suitable bus architecture, for example, a peripheral connect interface bus (PCI) or other interface bus. Memory 103 may contain code such as an operating system 127, which may be utilized by CPU 101 or other CPU to control one or more functions of the computer system 100. Additionally, the network interface controller ("NIC") 119 may be coupled to the super I/O device 123 through a Power Management Event (PME) line 125. The PME line 125 may be asserted (driven to an active state) when the NIC 119 receives a packet indicating the associated computer 100 should power on ("wake up"). The boot ROM 121 may include computer code or instructions that may allow CPU 101 to boot an operating system such as operating system 127 and perform other functions as may be described in association with FIG. 3.

Figure 2:
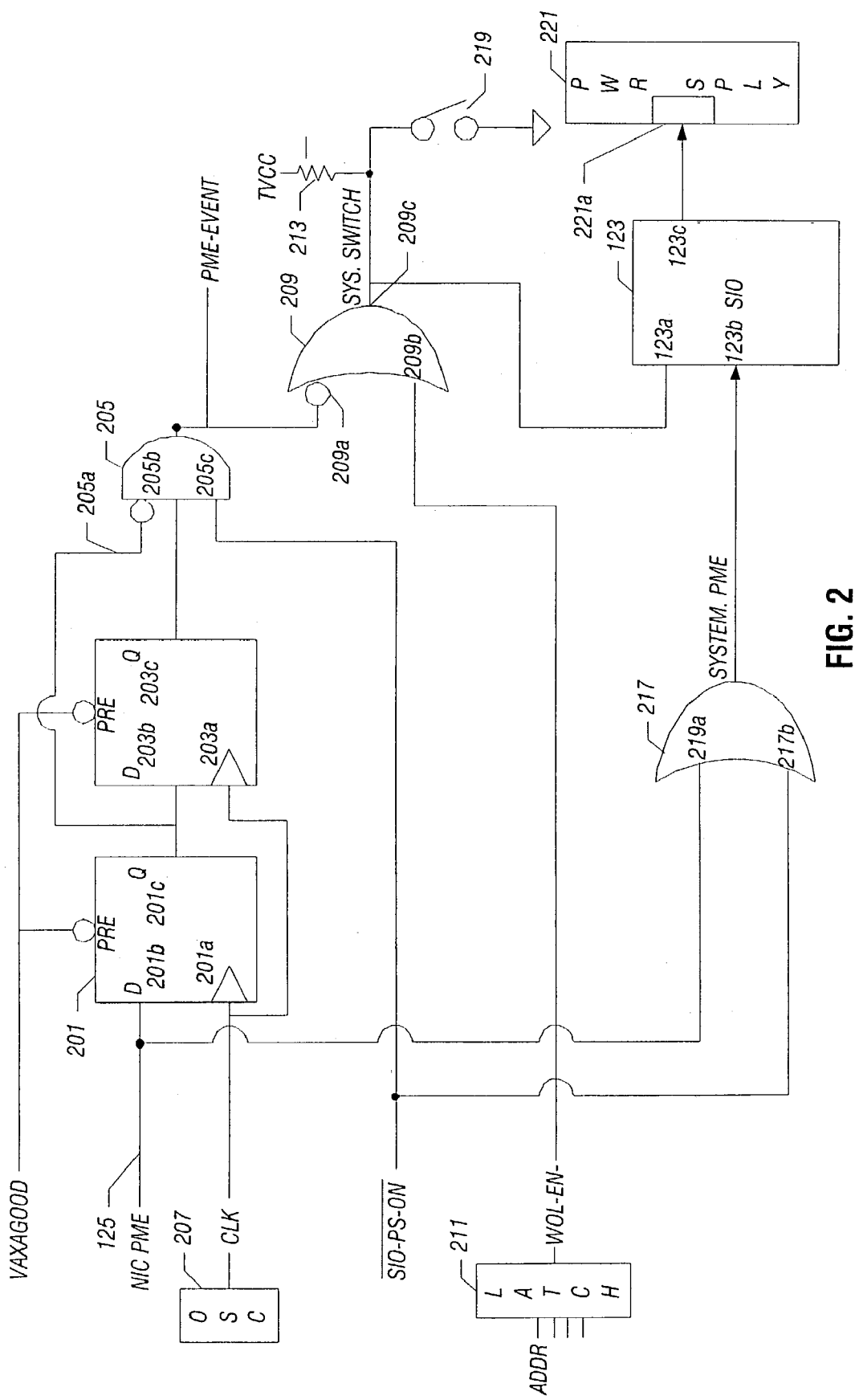
FIG. 2 illustrates a power management event circuit in accordance with embodiments of the present invention.

Referring now to FIG. 2, a circuit that may be useful for enabling a computer is illustrated. A first flip-flop 201 and a second flip-flop 203 are interconnected and coupled to inputs 205a and 205b of gate 205. An oscillator 207 has an output labeled "CLK" that connects to inputs 201a and 203a. Gate 205 has an output 205d that is coupled to an input 209a of gate 209. A second input 209b of gate 209 is coupled to the output of the latch WOL-EN of latch 211. WOL-EN may be an acronym for Wake On LAN-Enable and, in some embodiments, the WOL-EN input may be an active low input.

An open collector output 209c of gate 209 is coupled to a pull-up resistor 213, a power on switch 219 and an input 123a of a super I/O chip 123. Input 123b of super I/O chip 123 is connected to an output 217c of gate 217. Input 217a may be connected to input 201b of flip-flop 201 and PME line 125 from the network interface controller 119. Input 217b of gate 217 may be coupled to input 205c of gate 205 and signal SIO-PS-ON which may be a signal from the power supply that is low true when the computer is on. The output 123c of super I/O device 123 may be coupled to an input 221a of power supply 221. Additionally, present inputs PRE of flip-flops 201 and 203 may be coupled to a signal VAXAGOOD which may be a signal from power supply 221 or other signal that may indicate that the power supply is on and stable.

The super I/O device 123 may be a National Semiconductor super I/O device such as the PC 87413, PC 87414, PC 87416, PC 87417, or other devices of the National Semiconductor PC 8741X family of LPC server I/O devices. Additionally, other similar devices may also be useful from other manufacturers or the same manufacturer. As noted in the "LPC Server I/O for Servers in Work Stations", Revision 1.0, March 2001 available from National Semiconductor, "a power button event is always enabled for wake-up in any sleep state. In addition, the power button event is the only wake-up event available after a power button override or a crow bar condition". That is to say, if a crow bar condition such as a power supply over current anomaly is detected or certain other anomalies are detected, the computer may not be turned on remotely by a wake-on-LAN event.

A wake-on LAN event may typically occur when a special packet is sent to a computer such as computer 100 and received by a network interface controller such as network interface controller 119. This special packet may be recognized by the network interface controller 119 which may then notify a super I/O controller such as super I/O controller 123 through a coupled PME event line such as PME line 125 that a special packet has been received and that the computer should wake up from a sleep mode and perform one or more functions. As described below, embodiments of the present invention may allow the computer 100 to wake up when a PME event occurs such as the reception of a packet by the network interface controller 119. The network interface controller 119 may be powered by a circuit on power supply 221 or other power supply such that network interface controller 119 is typically always powered on even though much of the circuitry of computer 100 may not be.

The super I/O controller 123 which may be one or more members of the PC 8741X family by National Semiconductor, may include a PME input which may be reserved, or otherwise useful, for turning the computer system 100 on. However, as mentioned above, this signal will not be effective upon a crow bar or power button override situation where the computer was previously turned off. The circuitry as will be described in association with FIG. 2 below, may then be useful for removing the responsibility from the super I/O device 123 to turn the system on when a power management event occurs without regard to the method in which the computer 100 was powered off.

Describing now the circuit operation of FIG. 2, when the computer system 100 is in a sleep state, a PME signal is transmitted to the super I/O device 123 through the system switch input 123a of super I/O device 123. This in effect is parallel to the power on/off switch 219.

Digital flip-flops 201 and 203 operate as a digital signal falling edge detector and detects a falling edge of a PME event such as may be coupled by line 125 when the computer system 100 is in a sleep mode. A high-to-low transition on line 125 may indicate that a PME event is occurring. This edge detector 201, 203 sends a pulse to a masking logic circuit 205, 209 and 211 that may provide the user the ability to not recognize a PME event if so desired. If the masking logic 205, 209 and 211, are in the unmask mode, an input pulse from PME line 125 is coupled to the output of the masking logic 209c. If the making logic 205, 209 and 211 are in the mask mode, the input pulse from signal 125 is blocked from the output 209c of gate 209.

The output of the mask logic 209c is coupled to the system switch input of the super I/O device 123. As illustrated, a PME event will turn on computer system 100 as if the power on/off switch 219 were pressed by the user. This will enable the computer system 100 to wake up as if a power button event occurred and come out of a crow bar or power button override event if the last power down event occurred because either a crow bar or power button override. Should the last power down not be a crow bar or power button override, the computer 100 will also turn on as expected.

The edge detector 201 and 203 are designed to operate only when the computer unit 100 is in a sleep state to prevent an inadvertent turning off of computer 100 should a PME event from the network interface controller 119 be detected while the system is on. The PME event may, in some embodiments, come from network interface controllers placed in the slots 117. When the computer system is on, PME events will be presented to the super I/O device 123 via its PME input 123b rather than its system switch input 123a, which would turn the system off, an undesirable action. This is to insure that PME events will be forwarded to the processor 101 by the super I/O device 123 as required.

During a boot-up from a sleep state, the computer 100 may have to check all PME generators to see if they had a PME event pending. This may be necessary because the computer system 100 will not know if the system switch input was asserted by a PME event or by the user pressing the power switch 219. If a system switch was asserted due to a PME event, the agent that asserted the PME event, such as network interface controller 119, will have to be serviced accordingly.

The logic illustrated in FIG. 2 may typically be separate from the super I/O device 123. Of course, the logic may be individual logic components or integrated into a single or few devices such as a programming logic array or other similar device. The WOL_EN bit must typically be powered from a power supply that is powered on even when many devices in computer system 100 may be powered off so that the last desired user instruction for enabling/disabling a PME input may be saved, even though AC power is disconnected. Such a power supply may be generated from power supply 221, or other supply, or a battery.

The PME edge detectors 201 and 203 may typically consist of a flip-flop that holds the previous state of the signal on the "Q" outputs 201c and 203c. The signals are "ANDed" with inversion of the current state, which is the "D" input 203b of the latch 203. This will create a one clock cycle positive edge pull from "Q" output 203c. This pulse is then "ANDed" with a power supply on bit SIO-PS-ON. If the computer 100 is in a sleep mode, this bit SIO-PS-ON will be a "1", which will allow the pulse to propagate through gate 205. If the computer system 100 is not in the sleep mode, this bit SIO-PS-ON will be a "0" which will block the pulse from the output of gate 205. A maskable bit WOL-EN is gated with the output of gate 205 which is 205d, and will allow or disallow the pulse from gate 205 from propagating to the super I/O device 123, depending on the state of the line WOL-EN. The latch 211 may be an addressable latch that may be set by the user or other means to enable or disable the wake-on-LAN function.

The system PME input 123b of super I/O device 123 is a function of the OR of the SIO-PS-ON signal and the PME signal that may be generated on line 125. Both these signals may be active low. Therefore, if the power supply is on and if a PME from a device is asserted, both these signals will be "0" creating a "0" output when they OR together by OR gate 217. This may then indicate to super I/O device 123 that a PME event has occurred.

Figure 3:
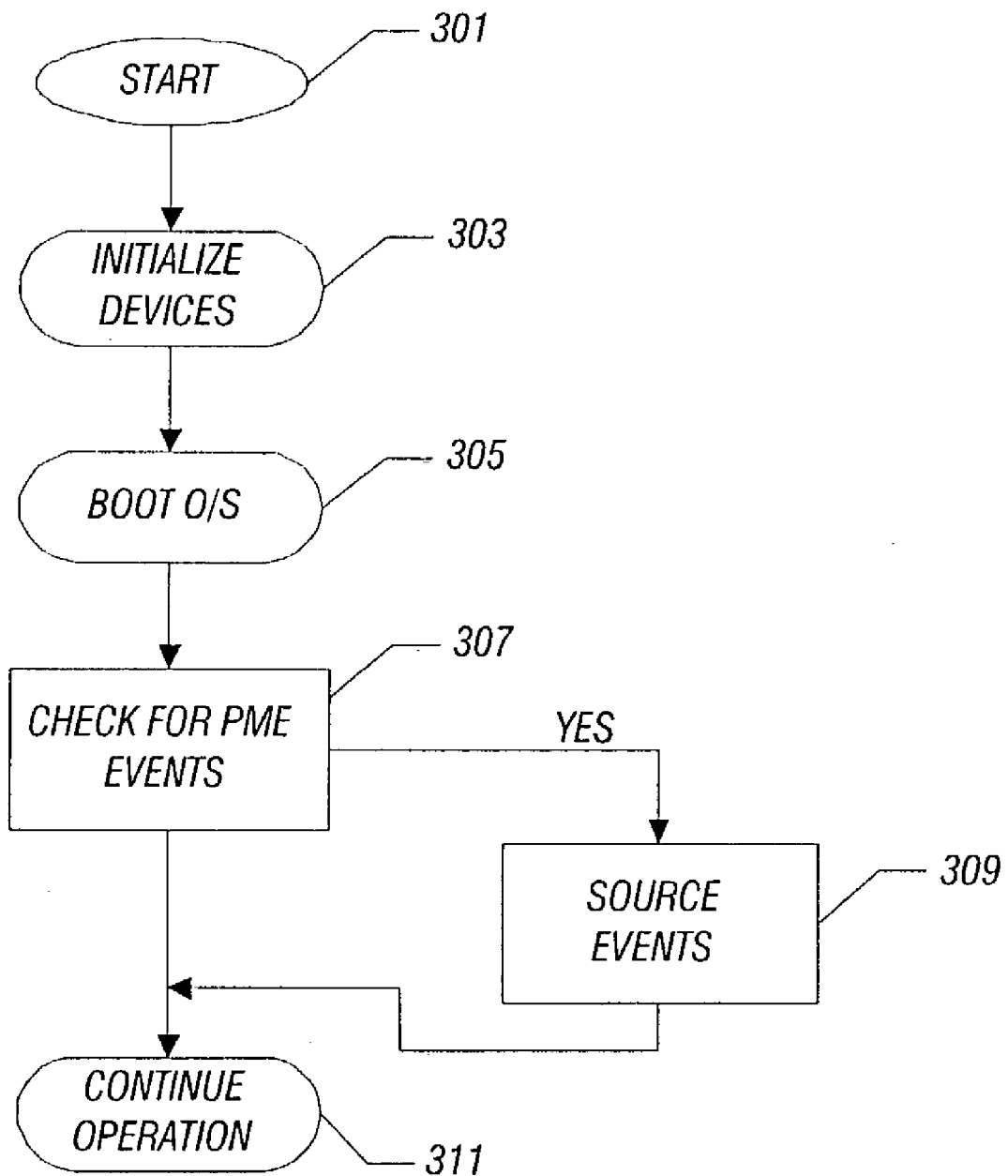
FIG. 3 illustrates a flow chart that may be utilized by a computer in accordance with embodiments of the present invention.

Referring now to FIG. 3, a flow chart that may be utilized by computer system 100 as part of the boot up instructions is illustrated. Upon initialization, computer system 100 may begin the boot-up process 301 by reading one or more instructions that may be stored in boot ROM 121. The instructions stored in boot ROM 121 may cause the CPU 101 or other CPU device to initialize various devices such as north bridge 105, south bridge 111 and other devices as required. The boot instructions may also cause CPU 101 or other CPU device to boot an operating system such as operating system 127 that may be stored in one or more storage devices that may be coupled to computer system 100.

Once the operating system is booted in block 305 or at some other time, the computer system 100 may check for PME events at block 307. This check may be performed, in some embodiments, by reading registers in the super I/O device 123. A check for PME events may be required as a PME event may be pending even though the computer system 100 was in a sleep or otherwise disabled mode. If a PME event was detected as pending, the computer system 100 may service such events at block 309 to, for example, respond to a packet that may have been received by network interface controller 119. After PME events have been serviced, the computer system 100 may continue with normal operations at block 311. Of course, if a PME event was not pending in block 307, the computer system 100 may continue operations at block 311.

The above descriptions and Figures, of course, describe a few of the many possible implementations of the present invention. Therefore, the above discussion is meant to be illustrative of the principles and various embodiments of the present invention, and numerous variations and modifications thereto will be come apparent to those skilled in the art once the above disclosure is fully appreciated. It is therefore intended that the following claims be interpreted to embrace all such variations and modifications.

What is claimed is:

1. A system comprising:
a processor-based circuit powered, in part, by a power supply having a power on input;
a system power switch circuit having an output coupled to the power on input;
a power management event circuit having a first input and having an output coupled to the power on input; and
the power supply supplying power to the processor-based circuit based, in part, on the output from the power management event circuit being at an active state, wherein the active state indicates a power on event, or based on the output of the system power switch circuit indicating a power on condition.

2. The system as in claim 1 wherein the power management event circuit output is coupled to a peripheral controller circuit and the peripheral controller circuit has an output coupled to the power supply power on input.

3. The system as in claim 2 wherein the system power switch circuit is coupled to an input of the peripheral controller circuit.

4. The system as in claim 1 wherein the power management event circuit first input is coupled to a network interface controller power management event line and wherein the power management event line is driven to an active state upon receipt by the network interface controller of a packet.

5. The system as in claim 4 wherein the packet contains data that causes, in part, the network interface controller to drive the power management event line to an active state.

6. The system as in claim 4 wherein the power management event circuit includes an enable circuit to selectively enable or disable the coupling of an active output state of the power management event circuit to the power on input of the power supply.

7. A processor-implemented method comprising:
asserting a power management event signal upon determining that a network interface card has received a packet;
combining the power management event signal with a system switch signal; and
powering on a power supply if either the power management event signal or system switch signal is asserted.

8. The method as in claim 7 further comprising utilizing a peripheral controller, including peripheral support circuits, coupled to the network interface card for powering on the power supply.

9. The method as in claim 8 further comprising utilizing an enable circuit to enable or disable an assertion of the power management event from causing, in part, the power supply from powering on.

10. The method as in claim 9 further comprising providing an input to the peripheral controller by combining the power management event signal with a system switch signal.

11. A processor based system-readable medium configured with instructions for causing a processor based system to:
assert a power management event signal upon determining that a network interface card has received a packet;
combine the power management event signal with a system switch signal; and
power on a power supply if either the power management event signal or system switch signal is asserted.

12. The processor based system-readable medium as in claim 11 further including utilizing a peripheral controller, including peripheral support circuits, coupled to the network interface card to power on the power supply.

13. The processor based system-readable medium as in claim 12 further including utilizing an enable circuit to enable or disable an assertion of the power management event from causing, in part, the power supply from powering on.

14. An apparatus for powering on a processor based system comprising:
means for asserting a power management event signal upon receipt of a packet containing data instructing, in part, the processor based system to power on;
means for combining the power management event signal with a system switch signal;
means for coupling the combined power management event signal and system switch signal to an input of a peripheral controller device; and
means for turning on a power supply, in part, in response to an output state of the peripheral controller device, wherein the power supply is turned on in response to either the power management event signal or the system switch signal.

15. The apparatus for powering on a processor based system as in claim 14 further comprising:
   means for selectably preventing the assertion of the power management event signal from causing, in part, the turning on of the power supply.

16. A system comprising:
   a processor-based circuit powered, in part, by a power supply having a power on input;
   a super I/O controller having an output coupled to the power on input;
   a network interface card having a power management signal coupled to the power on input of the super I/O controller wherein the power management signal is active upon receipt of the network interface card of a packet;
   a system switch circuit having a system switch signal coupled to the power on input of the super I/O controller; and
   the super I/O controller asserts a signal to turn on the power supply upon receipt of an asserted power management signal or upon receipt of a system switch signal.

17. The system as in claim 16 wherein the super I/O controller is one of PC 87413, PC 87414, PC 87416 or PC 87417 devices.

18. The system as in claim 16 comprising:
   An addressable latch coupled to the super I/O controller to prevent the assertion of the power management event signal from being received by the super I/O controller.

* * * * *

UNITED STATES PATENT AND TRADEMARK OFFICE
CERTIFICATE OF CORRECTION

PATENT NO. : 7,103,785 B2 Page 1 of 1
APPLICATION NO. : 10/448708
DATED : September 5, 2006
INVENTOR(S) : Alan M. Green et al.

It is certified that error appears in the above-identified patent and that said Letters Patent is hereby corrected as shown below:

In column 6, line 36, in Claim 10, delete "a" and insert -- the --, therefor.

In column 7, line 4, in Claim 15, delete "a" and insert -- the --, therefor.

In column 7, line 6, in Claim 15, delete "the" and insert -- an --, therefor.

In column 8, line 7, in Claim 16, delete "a" and insert -- the --, therefor.

In column 8, line 14, in Claim 18, delete "An" and insert -- an -- therefor.

In column 8, line 15, in Claim 18, delete "the" and insert -- an --, therefor.

Signed and Sealed this

Twenty-eighth Day of July, 2009

JOHN DOLL
*Acting Director of the United States Patent and Trademark Office*